(12) United States Patent
Sarda

(10) Patent No.: US 6,842,725 B1
(45) Date of Patent: Jan. 11, 2005

(54) METHOD FOR MODELLING FLUID FLOWS IN A FRACTURED MULTILAYER POROUS MEDIUM AND CORRELATIVE INTERACTIONS IN A PRODUCTION WELL

(75) Inventor: Sylvain Sarda, Cours Ferdinard de Lesseps (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 0 days.

(21) Appl. No.: 09/455,408

(22) Filed: Dec. 6, 1999

(30) Foreign Application Priority Data

Dec. 11, 1998 (FR) .............................................. 98 15727

(51) Int. Cl.[7] .............................................. G06G 7/48
(52) U.S. Cl. ............................... 703/10; 703/2; 703/9; 702/5; 702/11; 702/12; 702/13; 702/14
(58) Field of Search ..................... 703/10, 2, 9; 702/13, 702/14, 11, 12, 5

(56) References Cited

U.S. PATENT DOCUMENTS

| | | | | |
|---|---|---|---|---|
| 6,023,656 A | * | 2/2000 | Cacas et al. ................... | 702/13 |
| 6,038,389 A | * | 3/2000 | Rahon et al. .................. | 703/10 |
| 6,064,944 A | * | 5/2000 | Sarda et al. ................... | 702/11 |
| 6,094,619 A | * | 7/2000 | Noetinger et al. ............. | 702/12 |
| 6,106,561 A | * | 8/2000 | Farmer ......................... | 702/10 |
| 6,356,860 B1 | * | 3/2002 | Barnette ........................ | 703/2 |

OTHER PUBLICATIONS

Berryman et al., "The Elastic Coefficients of Double–Porosity Models for Fluid Transport in Jointed Rock", J. Geophys. Res., 100, 24,611–24,627, Jun. 1995.*

Frolkovic, "Finite Volume Discretizations of Density Driven Flow in Porous Media", In: Finite Volumes for Complex Applications (Benkhaldoun F, Vilsmeier R., eds.), Hermes, Paris, 1996, pp. 433–440.*

Jones et al., "Control–Volume Mixed Finite Element Methods", Computational Geosciences, 1, 1997, pp. 289–315.*

Fuhrmann et al., "Stability and Existence of Solutions of Time–Implicit Finite Volume Schemes for Viscous Nonlinear Conservation Laws", Preprint 437, Weierstraβ Institute, Berlin Sep. 25, 1998, pp. 1–20.*

* cited by examiner

Primary Examiner—Jean R. Homere
Assistant Examiner—Herng-der Day
(74) Attorney, Agent, or Firm—Antonelli, Terry, Stout & Kraus, LLP

(57) ABSTRACT

A method is disclosed for modelling fluid flows in a fractured multilayer porous medium by accounting for the real geometry of the fracture network and the local exchanges between the porous matrix and the fractures at each node of the network, thus allowing simulation of the interactions between the pressure and flow rate variations in a well running across the medium. The method essentially comprises discretizing the fractured medium by means of a mesh pattern, with fracture meshes centered on nodes at the various intersections of the fractures with each node being associated with a matrix volume, and determination of the flows between each fracture mesh and the associated matrix volume in a pseudosteady state. The method can be applied in hydrocarbon production well testing.

3 Claims, 5 Drawing Sheets

METHOD FOR MODELLING FLUID FLOWS IN A FRACTURED MULTILAYER POROUS MEDIUM AND CORRELATIVE INTERACTIONS IN A PRODUCTION WELL

BACKGROUND OF THE INVENTION

1. Field of the Invention

The present invention relates to a method for simulating well tests on a discrete fractured reservoir model.

2. Description of the Prior Art

Single-phase flow computing tools are currently used. However, these tools are not applied to the real geologic medium in view of the complexity thereof and instead are applied to a homogenized representation, according to the reservoir model called a "double-medium model" described for example by Warren and Root in "The Behavior of Naturally Fractured Reservoirs", SPE Journal, September 1963. Any elementary volume of the fractured reservoir is thus modelled in the form of a set of identical parallelepipedic blocks limited by an orthogonal system of continuous uniform fractures oriented in the direction of one of the three main directions of flow (model referred to as "sugar box" model). The fluid flow on the reservoir scale occurs through the fractured medium only, and fluid exchanges take place locally between the fractures. The matrix blocks are not applied to the complex medium. This representation, which does not reproduce the complexity of the fracture network in a reservoir, is however effective but at the level of a reservoir mesh whose typical dimensions are 100 m×100 m.

It is however preferable to carry out the flow calculations on the "real" geologic model instead of an equivalent homogeneous model, which affords the double advantage of allowing:

validation of the geologic image of the reservoir provided by the geologist from all the information gathered on the reservoir fracturation (this validation being performed by comparison with the well test data), reliably testing the sensitivity of the hydraulic behavior of the medium to the uncertainties on the geologic image of the fractured medium.

A well-known modelling method is finely meshing the fracture network and the matrix while making no approximation concerning fluid exchanges between the two media. It is however difficult to implement because the often complex geometry of the spaces between the fractures makes difficult the meshing of the spaces. In any case, the number of meshes to be processed is often very large. The complexity increases still further with a 3D mesh pattern.

Techniques for modelling fractured porous media are described in French Patents 2,757,947 and 2,757,957 filed by the assignee. The technique of the first patent relates to determination of the equivalent fracture permeability of a fracture network in an underground multilayer medium from a known representation of the network, allowing systematic connection of fractured reservoir characterization models to double-porosity simulators in order to obtain more realistic modelling of a fractured underground geologic structure. The technique of the second patent relates to simplified modelling of a porous heterogeneous geologic medium (such as a reservoir crossed through by an irregular network of fractures for example) in the form of a transposed or equivalent medium so that the transposed medium is equivalent to the original medium, according to a determined type of physical transfer function (known for the transposed medium).

SUMMARY OF THE INVENTION

The method according to the invention allows simulation single-phase flows in a fractured medium.

The method can be implemented for example in the field of oil production by reservoir engineers in order to obtain reliable flow predictions.

A well test is to be simulated in a permeable porous medium (reservoir) crossed through by a network of fractures much more conducting than the porous matrix. Fractured reservoirs constitute an extreme type of heterogeneous reservoirs comprising two very different media, a matrix medium containing the most part of the oil in place and having a low permeability, and a fractured medium representing less than 1% of the oil in place and highly conducting. The fractured medium itself can be complex, with different series of fractures characterized by their respective density, length, orientation, inclination and opening.

During well testing, the flow rate conditions imposed on the well lead the oil contained in the reservoir to flow towards the well. It is a single-phase (the only mobile phase is the oil) and compressible flow (the rock of the reservoir and the oil fluid are compressible).

For any elementary volume of the reservoir, the pressure of the oil contained in this volume is governed by the following equation, if gravity is not taken into account:

where:

$$\phi C_T \frac{\partial P}{\partial t} = div\left(\frac{K}{\mu} \cdot \nabla P\right) + Q \tag{1}$$

$\phi$: represents the pore volume, $C_T$, the total compressibility (fluid+rock), K, the permeability of the rock, $\mu$, the viscosity of the fluid, Q, the incoming flow, which is zero everywhere except in places where the well communicates with the reservoir, and P, the unknown pressure.

In order to simulate a well test, whatever the medium, this equation has to be solved in space and in time. Discretization of the reservoir (mesh pattern) is therefore performed and solution of the problem consists in finding the pressures of the meshes with time, itself discretized in a certain number of time intervals.

In the case of a fractured medium, if all the complexity of the fracture network is to be taken into account, it is necessary to have a mesh pattern that represents this network accurately. Furthermore, in such a medium, the permeabilities K are generally much higher in the fractures than in the matrix, and the flows are consequently fast in the fractures and slow in the matrix.

The method according to the invention models fluid flows in a fractured multilayer porous medium by accounting for the real geometry of the fracture network and the local exchanges between the porous matrix and the fractures at each node of the network, and thus simulates the interactions between the pressure and flow rate variations in a well running across the medium. The fractured medium is discretized by means of a mesh pattern wherein the fracture meshes are centered on nodes at the various intersections of the fractures, each node being associated with a matrix volume, and the flows between each fracture mesh and the associated matrix volume are determined in a pseudosteady state.

The matrix volume associated with each fracture mesh in each layer is for example defined by all of the points that are closer to the corresponding node than to neighboring nodes.

In order to determine the matrix volume associated with each fracture mesh, each fractured layer is for example discretized in pixels and the distance from each pixel to the closest fracture mesh is determined.

The value of the transmissivity for each fracture mesh—matrix block pair is determined for example by considering that the pressure varies linearly as a function of the distance from the point considered to the fracture mesh associated with the block.

The method according to the invention greatly simplifies calculation of the exchanges between the matrix and the fractures. In fact, there is no specific mesh pattern for the matrix, but each node of the fracture network is associated with a matrix volume, and the flow between each fracture node and its associated block is calculated in a pseudosteady state. The invention concerns calculation of the volume of each block and of a proportionality coefficient (called transmissivity) that connects the matrix-fracture flow rate to the matrix-fracture pressure difference.

The main advantage of the method according to the invention in relation to methods applied to a finely meshed real fracture network lies, as detailed in the description hereafter, in a considerable reduction in a number of meshes centered on fracture nodes used to solve equation (1). The simulation rate saving in relation to prior fine-mesh methods can be confirmed to be greater than the simple arithmetical ratio of the number of meshes used in both cases.

BRIEF DESCRIPTION OF THE DRAWINGS

Other features and advantages of the method according to the invention will be clear from reading the description hereafter of a non limitative realisation example, with reference to the accompanying drawings wherein.

DETAILED DESCRIPTION OF THE INVENTION

1) Fracture network discretization

The method comprises meshing the multilayer fractured reservoir modelled for example by means of the fractured reservoir modelling technique described notably in the aforementioned French Patent 2,757,947 assuming that the fractures are substantially perpendicular to the layer boundaries.

Figure 1:
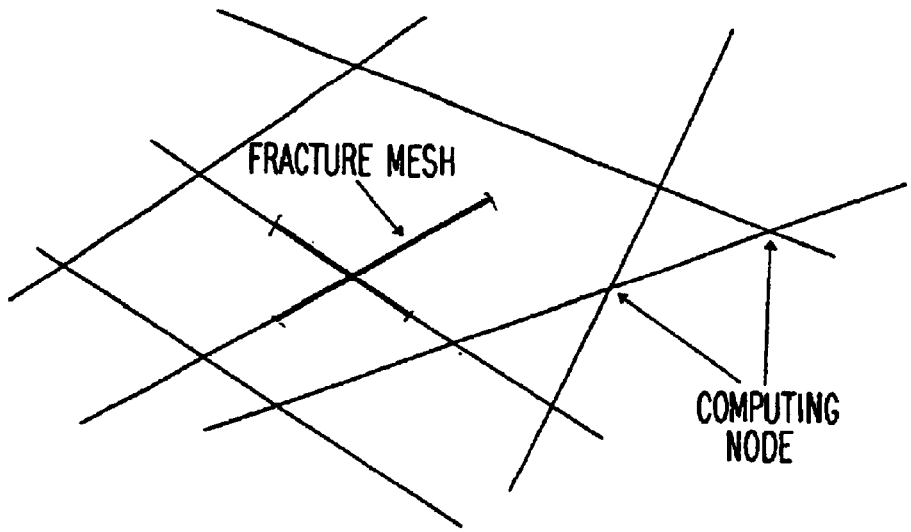
FIG. 1 shows an example of a 2D fracture mesh, Fracture Mesh.

In order to form this mesh pattern, all the fracture intersections or computing nodes are located (FIG. 1) and fracture meshes are formed by associating a single matrix block MB (FIG. 2) with each node. For the purpose of 3D modelling, additional nodes have to be added in the neighboring layers in order to account for the fractures that run across several layers. The computed nodes thus defined constitute the center of the fracture meshes. The meshes are given boundaries such as the ends of the fractures on the one hand and the midpoint of the segments connecting the computing nodes on the other hand. Considering these boundaries imposed on the meshes, the volume $\phi$ of the meshes can be calculated (See relation 1). Calculation of the connections between fracture meshes (transmissivities) used for calculation of the inter-mesh flows can be carried out according to the method described in the aforementioned French Patent 2,757,947.

2) Matrix medium discretization

Discretization of the matrix medium assigns a rock volume to each fracture mesh. During dynamic simulation, exchanges between the matrix and the fractures are calculated in the pseudosteady state (exchange flow proportional to the pressure difference) between each fracture mesh and the associated single matrix block.

For calculation of the matrix volumes, the problem is dealt with layer by layer, which amounts to disregarding the vertical flows in relation to the horizontal flows in the matrix.

For a given layer, the blocks are defined as follows:
the block heights are equal and fixed to the height of the layer,
in the plane of the layer, the surface area of the block associated with a fracture mesh is all the points that are closer to the fracture mesh than to another one.

Physically, this definition implies that the boundaries at zero flow in the matrix are the equidistance lines between the fracture meshes. This approximation is valid if the neighboring fractures are at very close pressures, which is true in the presence of highly conducting fractures in relation to the matrix.

a) Block geometry

In order to determine the geometry of the blocks in a given layer, a two-dimensional problem has to solved which finds, for each fracture mesh, the points that are closer to this mesh than to another one. This problem is solved by using for examples but preferably, the geometric method described in the other aforementioned French Patent 2,757,945, which allows, by discretizing the fractured layer into a set of pixels and by applying an image processing algorithm, to determine the distance from each pixel to the closest fracture. During the initialization phase of this algorithm, value 0 (zero distance) is assigned to the pixels belonging to a fracture and a high value is assigned to the others. Furthermore, if the number of the fracture mesh to which each fracture pixel belongs is given in this phase, the same algorithm finally allows to determine, for each pixel:
the distance from this pixel to the closest fracture mesh,
the number of the closest fracture mesh.

Figure 2:
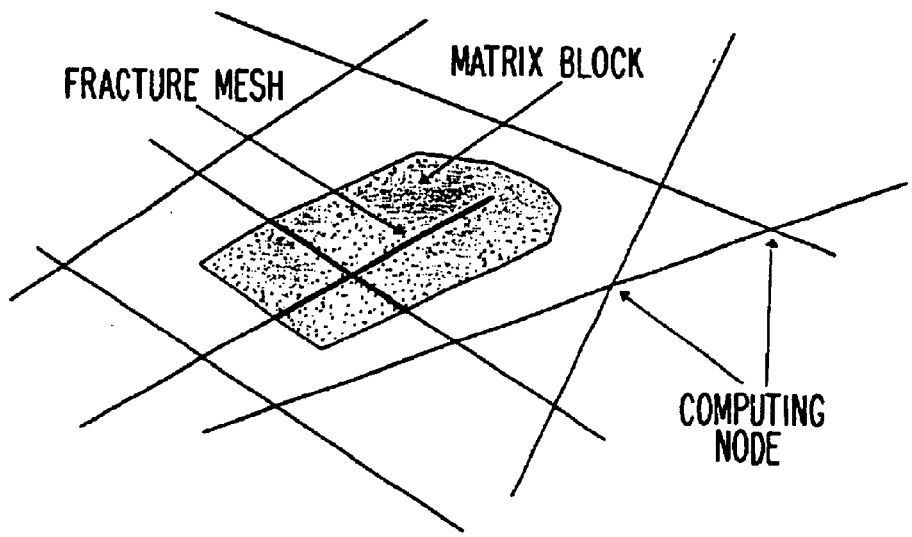
FIG. 2 shows an example of a 2D matrix block, Matrix Block.

All of the pixels having the same fracture mesh number constitute the surface area of the matrix block associated with this mesh. Multiplying this surface area by the height of the layer allows obtaining the volume of the block associated with the mesh. FIG. 2 shows an example of a thus obtained 2D matrix block.

By construction, the sum of the surface areas of the blocks is equal to the total surface area of the layer, which guarantees that no volume is added to or taken from the layer.

For each matrix block, the image processing algorithm also gives the distance from each pixel of the block to the associated fracture mesh. This data is used to calculate the transmissivity between the fracture mesh and the matrix block.

b) Matrix-fracture transmissivity

On the assumption of a pseudosteady state where the exchange flow is considered to be proportional to the difference in the pressures of each one of them, the following relation exists:

$$F_{mf} = \frac{T_{mf}}{\mu}(P_m - P_f) \quad (2)$$

where:

$F_{mf}$ is the matrix-fracture flow, $T_{mf}$, the matrix-fracture transmissivity, $\mu$, the viscosity, $P_m$, the pressure of the matrix block, and $P_f$, the pressure of the associated fracture mesh.

On the assumption of a pseudosteady state, the value of transmissivity $T_{mf}$ is constant during simulation. This value is here calculated for each fracture mesh—matrix block pair.

For this calculation, it is assumed that, in the matrix block, the pressure varies linearly as a function of the distance from the point considered to the fracture mesh associated with the block. The transmissivity is defined as follows:

$$T_{mf} = \frac{2l \cdot H \cdot K}{D} \quad (3)$$

where:

I is the length of the fractures in the fracture mesh,

H, the height of the layer (and of the matrix block),

K, the permeability of the matrix, and

D, the distance from the fractures for which the pressure is the mean pressure of the block.

I, H and K are known (factor 2 comes from the fact that the fracture has two faces). Calculation of D is made from the information provided by the image processing algorithm concerning the distances from the pixels to the closest fractures. In fact, according to the hypothesis of linear variation of the pressure as a function of the distance to the fracture, the relationship is:

$$D = \frac{1}{S} \cdot \int_S d(s)ds \quad (4)$$

where S is, in 2D, the surface area of the matrix block and d(s) is the function giving the distances between the points of the matrix block and the associated fracture mesh.

In terms of pixels, the relationship is:

$$D = \frac{1}{N} \sum_N d_n \quad (5)$$

where N is the number of pixels of the matrix block and $d_n$ the distance from pixel n to the fracture mesh.

3) Well representation

A well is represented by its geometry on the one hand and by the flow rate constraints imposed thereon with time on the other hand.

a) Geometry

A well is a series of connected segments that intersect the network fractures. The geometric representation of a well is therefore a 3D broken line. Some segments of this broken line communicate with the reservoir. The points of communication between the well and the network are the points of intersection of these segments communicating with the fractures.

b) Flow rate constraints

The flow rate constraints are imposed at the point where the well enters the fractured medium. The flow rates are entered by the user in the form of a step function giving the flow rate as a function of time. The flow rate change times of the well indicate the various periods to be simulated.

Figure 3:
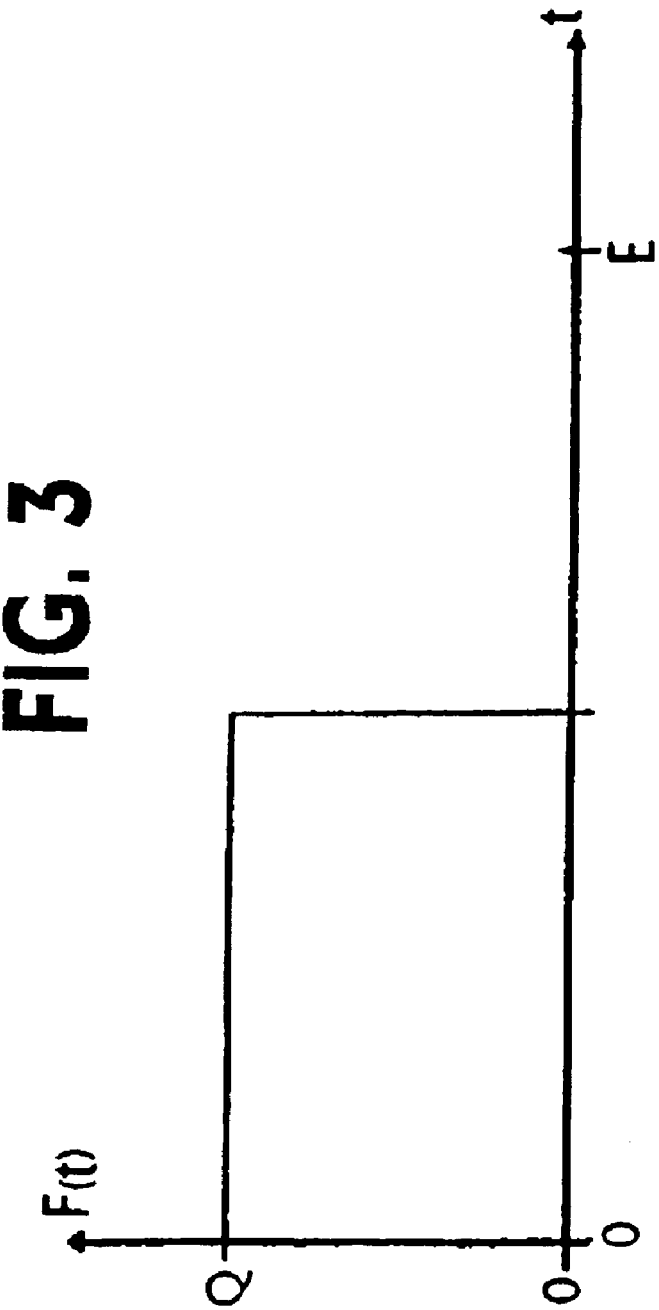
FIG. 3 shows an imposed flow rate variation curve F(t) in a well test.

For a conventional well test (FIG. 3), a flow rate F(t) is imposed for a first period after which the well is closed (zero flow rate) and the pressure buildup is observed in the well.

4) Dynamic simulation

During dynamic simulation, the simulated period of time is split up into time intervals whose duration ranges, for a well test, between 1 s just after opening or closing of the well) and in a range of hours.

Passage from the time n (where all the pressure values are known) to the time n+1 is achieved by solving, in all the meshes and blocks of the reservoir, the following equation which corresponds to relation 1 once discretized:

$$\phi_i \cdot C_T \cdot \frac{P_i^{n+1} - P_i^n}{t^{n+1} - t^n} + \sum_j \frac{T_{ij}}{\mu}(P_i^{n+1} - P_j^{n+1}) = Q_i \quad (6)$$

where:

i, the number of the mesh or of the block, j, the number of the mesh or of the block next to i, $P^n$, the pressure at the time n, $t^n$, the time at the time n, $Q_i$, the flow entering i, and $T_{ij}$, the connection transmissivity between i and j.

Apart from the pressures, the terms of this equation are known. The pore volumes of the fracture meshes and of the matrix blocks ($\phi_i$) are known by means of the mesh pattern, the fracture-fracture and matrix-fracture transmissivities ($T_{ij}$) are calculated as described above and flow rates ($Q_i$) are zero everywhere except at the well-reservoir connections where they are imposed.

a) Elimination of the unknowns relative to the matrix

Equation (7) can be solved by inversion of a linear system where the unknowns are the pressures of the fracture meshes and the pressures of the matrix blocks at the time n+1.

However, since each matrix mesh is only connected to one matrix block and since the blocks are not connected to each other, it is possible to eliminate the unknowns of the blocks of the system whose size is then divided by 2.

In fact, for a matrix block, equation (7) is expressed as follows:

$$\phi_m \cdot C_{Tm} \frac{P_m^{n+1} - P_m^n}{t^{n+1} - t^n} + \frac{T_{mf}}{\pi}(P_m^{n+1} - P_f^{n+1}) = 0 \quad (7)$$

subscripts m and f denoting the matrix and the fracture respectively, and $C_{Tm}$ being the total compressibility of the matrix.

The relationship is $C_{Tm} = c_m + Swc_w + (1-Sw)c_o$, where Sw is the residual water saturation in the matrix, $c_m$ the compressibility of the matrix, $c_w$ the compressibility of the water and $c_o$ the compressibility of the oil, and $\phi_m$ is the pore volume of the matrix block, that is the volume of the block multiplied by the porosity of the matrix.

The relationship is deduce therefrom that:

$$P_m^{n+1} = \frac{A_m}{A_m + U_m} \cdot P_m^n + \frac{U_m}{A_m + U_m} \cdot P_f^{n+1} \quad (8)$$

with:

$$\begin{cases} A_m = \dfrac{\phi_m \cdot C_{Tm}}{t^{n+1} - t^n} \\ U_m = \dfrac{T_{mf}}{\mu} \end{cases}$$

By transferring this expression into the equation relative to the fracture mesh, the relationship is obtained:

$$\left[ A_i + \frac{A_m U_m}{A_m + U_m} + \sum_j U_j \right] \cdot P_i^{n+1} - \sum_j \frac{T_{ij}}{\mu} \cdot P_j^{n+1} = \quad (9)$$

$$Q_i + A_i P_i^n + \frac{A_m U_m}{A_m + U_m} \cdot P_m^n$$

where i is the number of the fracture mesh considered, j the numbers of the fracture meshes connected to i, and m the number of the block associated with fracture mesh i.

Furthermore, the relationship is:

$$A_i = \frac{\phi_i \cdot C_{Tf}}{t^{n+1} - t^n}$$

where $C_{Tf}$ is the total fracture compressibility: $C_{Tf} = c_f + c_o$.

Reduction of the number of unknowns by a factor 2 is a further advantage of the present method. The solution time for a linear system develops approximately like the square of the number of unknowns, and consequently elimination of the matrix unknowns leads to a considerable saving in the rate of simulation of a well test on a fractured network.

b) Time interval solution algorithm

The general algorithm for solving a time interval forms a linear system corresponding to equation (9) relative to any fracture mesh i, in solving this linear system and in updating the unknowns.

The stages of this algorithm are as follows:
Forming the linear system with calculation of the terms of equation (9)
  Calculation of the fracture medium contribution
    accumulation term ($A_i$)
    connection between fracture meshes ($T_{ij}/\mu$)
    well boundary conditions ($Q_i$)
  Calculation of the matrix medium contribution
    accumulation term ($A_m$)
    matrix-fracture connection term ($U_m$)
Solving the linear system (so as to find the fracture pressure values at the time n+1) by means of the iterative conjugate gradient algorithm (CGS)
Updating with calculation of the matrix block pressures using equation (8), and time interval management.

c) Time Interval management

During well test simulation, the time intervals are generally very short after opening or closing of the well, because the pressure variations are high at these times. Later, the time intervals can be longer when the pressure variations are lower.

Management of the time intervals connects the duration of the time interval n+1 to the maximum pressure variation observed during time interval n. The user must therefore provide the following data:
  Initial time interval: $dt_{ini}$
  Minimum time interval: $dt_{min}$
  Maximum time interval: $dt_{max}$
  Lower limit of pressure variation $dp_{min}$
  Upper limit of pressure variation: $dp_{max}$
  Time interval increase factor: rdt +(>1)
  Time interval reduction factor: rdt −(<1).

From these values, management of the time interval is performed as follows:

At the time $t_n$, the majority of the pressure variations in the fracture meshes and the matrix blocks during time interval n is calculated (i.e. between times $t^{n-1}$ and $t^n$). According to the value of this pressure variation dp, the time interval is either:
  increased by a factor rdt+ if dp<$dp_{min}$,
  decreased by a factor rdt− if dp>$dp_{max}$,
  unchanged in the other cases.

After each well flow rate condition change, the time interval is reinitialized to the value $dt_{ini}$. Furthermore, an optimization is performed at the end of the simulation period: if tf is the time to be simulated to reach the end of the period and dt the planned time interval, the time interval selected is min($t_{f/2}$,dt).

5) Simulation input data a) Fracture network

The geometry of the fracture network and the attributes of the fractures (conductivity, opening) are given in the form of a file as in the method described in the aforementioned French Patent 2,757,947.

b) Petrophysics

The petrophysical data to be provided are as follows (the unit is given between parentheses):
  compressibility of the fracture network ($c_f$ in bar$^{-1}$)
  compressibility of the matrix ($c_m$ in bar$^{-1}$)
  matrix permeability (K in mD)
  matrix porosity for computing the pore volume.

The data in question are considered to be homogeneous on the fractured medium considered.

c) Fluids

The data relative to the fluids contained in the fractured medium concern the oil (mobile) and the water (immobile) that is always present in residual amounts in the matrix:
  residual water saturation in the matrix (Sw dimensionless)
  compressibility of the water ($c_w$ in bar$^{-1}$)
  compressibility of the oil ($c_o$ in bar$^{-1}$)
  viscosity of the oil ($\mu$ in cpo).

d) Well

The data relative to the well are:
  its geometry, in the form of a series of connected segments
  the imposed flow rates, in the form of a curve giving the imposed flow rate as a function of time.

e) Time management

The values to be provided are the values already defined in the chapter relative to the time interval management: $dt_{ini}$, $dt_{min}$, $dt_{max}$, $dp_{min}$, $dp_{max}$, rdt+ and rdt−.

Comparative meshing example

Figure 4:
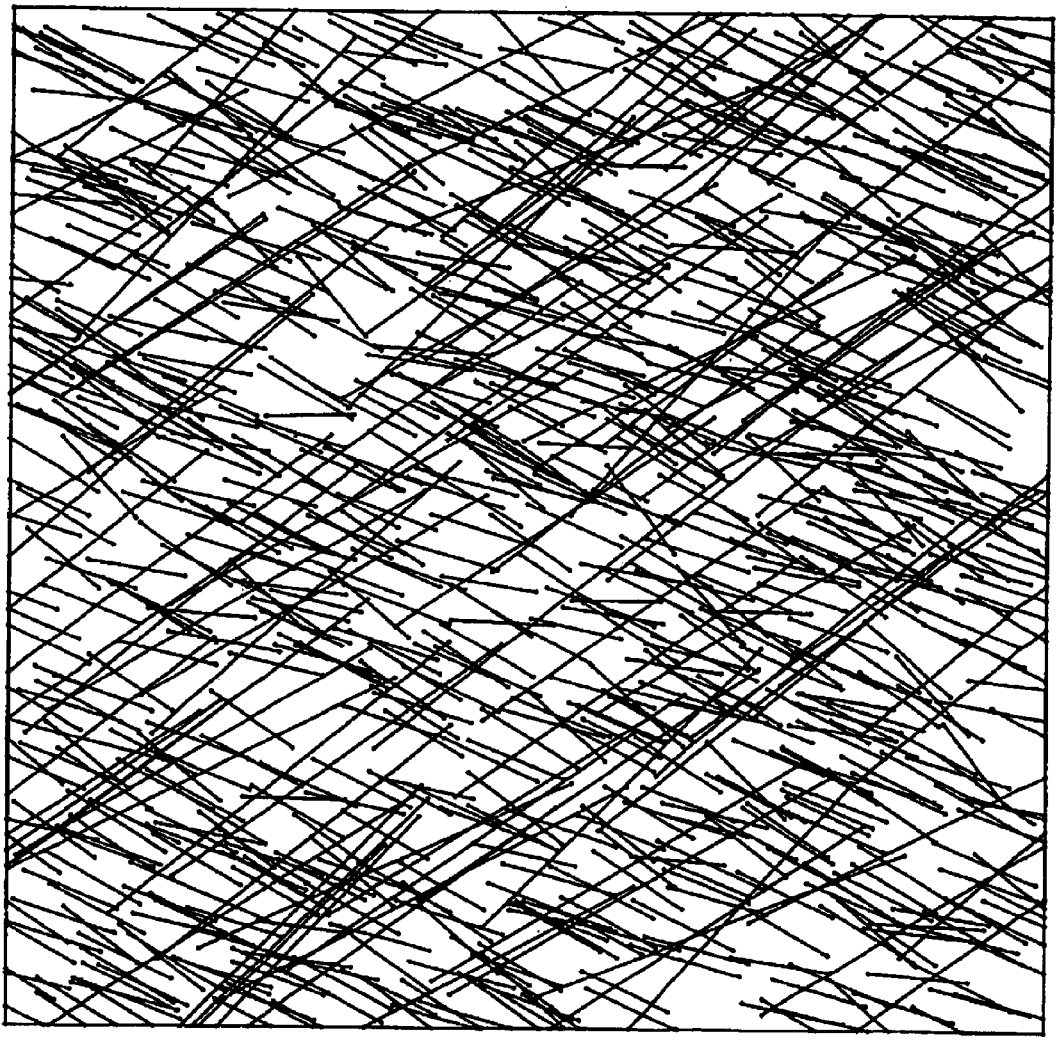
FIG. 4 shows an example of a fracture network for which the method according to the invention leads to a substantial reduction in the number of meshes to be processed.

The following comparative example illustrates the meshing simplification and the correlative saving in flow calculating time that can be obtained by implementing the method. By way of comparison, it has been observed that the fractured zone shown in FIG. 4, that normally would have been meshed with 80,000 meshes with conventional meshing techniques, can be meshed here with about 4000 meshes only.

Figure 5:
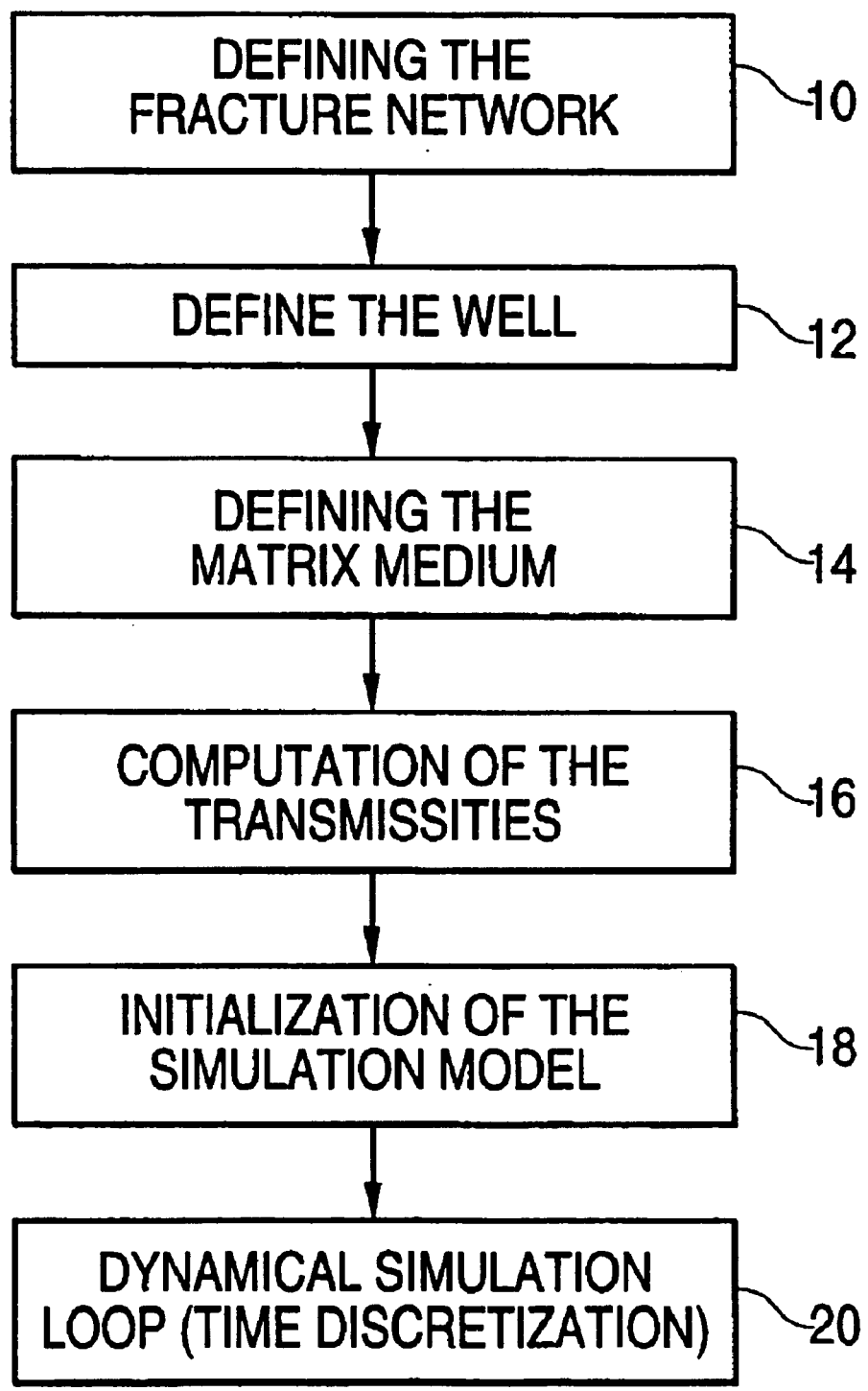
FIGS. 5 and 6 illustrate flow charts of the method of the present invention.

FIG. 5 illustrates a flow chart of the overall processing of the invention. Processing starts at step 10, where the fracture network is defined as discussed above under fracture network definition. Processing proceeds to step 12 where the well is defined as discussed above under well representation. Processing proceeds to step 14 where the matrix medium is defined as discussed above with respect to matrix medium definition. Processing proceeds to step 16 where computation of the transmissivities occurs as discussed above under matrix-fracture transmissivity, elsewhere with respect to the transmissitivity $T_{ij}$ and as further discussed with respect to a linear system as set forth in equation 9. Processing proceeds to step 18 where initialization occurs as discussed above with reference to fracture network and matrix medium discretization. Finally, processing proceeds to step 20 where a dynamic simulation loop occurs involving time definition.

Figure 6:
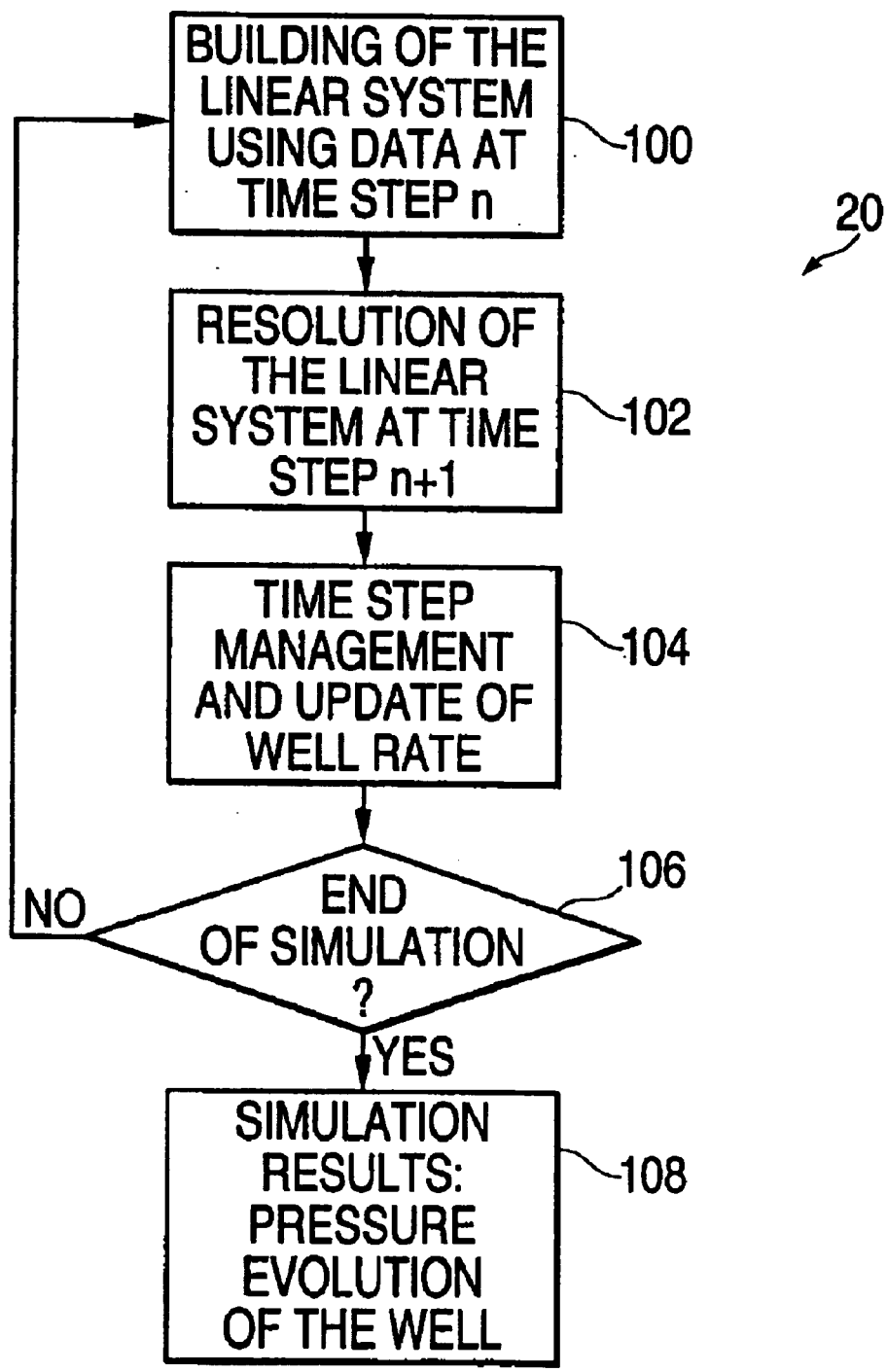

FIG. 6 illustrates a flow chart of the dynamic simulation loop 20. Processing in the dynamic simulation loop 20 begins with step 100 where building of the linear system using data at time steps n, occurs as discussed above regarding time interval solution algorithm. Processing proceeds to step 102 where resolution of the linear system is step n+1 occurs as discussed under time interval solution algorithm. Processing proceeds to step 104 where time step management and update of well rate occurs as discussed under time interval management. Processing proceeds to decision point 106 where determination is made if an end of simulation has occurred. If an end of simulation is not sensed at decision point 106 as described above under time interval management, the processing returns to point 100. If the end of simulation is sensed at decision point 106, and output of the simulation which represents the pressure evolution of the well are produces as indicated at step 108.

What is claimed is:

1. A method for modeling fluid flows in a fractured multilayer porous medium to simulate interactions between pressure and flow rate variations in a well through the medium, comprising:

discretizing the fractured medium by a mesh pattern with fracture meshes centered on nodes at fracture intersections with each node being associated with a matrix volume; and determining flows between each fracture mesh and the associated matrix volume in a pseudosteady state by using an image processing algorithm.

2. A method as claimed in claim 1, wherein:

each fractured layer is discretized in pixels and the matrix volume associated with each fracture mesh is defined by determining a distance from each pixel to a closest fracture mesh.

3. A method as claimed in claim 2, comprising:

determining at any point a transmissivity value for each pair of a fracture mesh and a matrix block by considering that pressure varies linearly depending on a distance from a point being considered to the fracture mesh associated with the matrix block.

* * * * *